(12) United States Patent
Willging et al.

(10) Patent No.: US 7,565,431 B2
(45) Date of Patent: Jul. 21, 2009

(54) METHOD, SYSTEM, AND PROGRAM FOR DETERMINING INFORMATION ON A STORAGE SYSTEM IN A NETWORK

(75) Inventors: Timothy Clarence Willging, Fulton, IL (US); Justin Russell Bendich, Austin, TX (US); Kevin Joseph Webster, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 10/721,017

(22) Filed: Nov. 20, 2003

(65) Prior Publication Data

US 2005/0114477 A1   May 26, 2005

(51) Int. Cl.
*G06F 15/173* (2006.01)
(52) U.S. Cl. ........................................ 709/226; 709/223
(58) Field of Classification Search .................... None
See application file for complete search history.

(56) References Cited

U.S. PATENT DOCUMENTS

| | | | |
|---|---|---|---|
| 5,996,030 A | 11/1999 | Ofer | |
| 6,839,747 B1* | 1/2005 | Blumenau et al. | 709/223 |
| 6,845,395 B1* | 1/2005 | Blumenau et al. | 709/223 |
| 7,020,758 B2* | 3/2006 | Fisk | 711/172 |
| 7,209,967 B2* | 4/2007 | Kitamura | 709/225 |
| 7,222,172 B2* | 5/2007 | Arakawa et al. | 709/224 |
| 2003/0093509 A1 | 5/2003 | Li et al. | |
| 2003/0154281 A1* | 8/2003 | Mitsuoka et al. | 709/225 |
| 2003/0177261 A1* | 9/2003 | Sekiguchi et al. | 709/238 |
| 2003/0204597 A1* | 10/2003 | Arakawa et al. | 709/226 |
| 2003/0225884 A1* | 12/2003 | Hayden | 709/226 |
| 2004/0078454 A1* | 4/2004 | Abrahams et al. | 709/221 |
| 2004/0143643 A1* | 7/2004 | Takamoto et al. | 709/215 |
| 2005/0044198 A1* | 2/2005 | Okitsu et al. | 709/223 |
| 2007/0067428 A1* | 3/2007 | Ogawa et al. | 709/223 |

OTHER PUBLICATIONS

"Information Technology—SCSI Primary Commands- 2 (SPC-2)", Revision 20, Jul. 18, 2001, pp. 1-4, 80-90. (Working document of T10/NCITS, Ref. No. ANSI (r) NCITS.351:200X)

* cited by examiner

*Primary Examiner*—John B. Walsh
(74) *Attorney, Agent, or Firm*—David Victor; Konrad Raynes & Victor LLP

(57) ABSTRACT

Provided are a method, system, and program for providing information on a network storage system. Information is received from host systems identifying storage units the host systems access through at least one identified storage system. The at least one storage system is probed to determine storage units available through the storage system and an identifier of the storage system. The information received from the host systems on storage units the host systems access and the information probed from the at least one storage system on the storage units available through the storage system are processed to determine an association of host systems to storage units for the at least one storage system.

30 Claims, 7 Drawing Sheets

METHOD, SYSTEM, AND PROGRAM FOR DETERMINING INFORMATION ON A STORAGE SYSTEM IN A NETWORK

BACKGROUND OF THE INVENTION

1. Field of the Invention

The present invention relates to a method, system, and program for determining information on a storage system in a network.

2. Description of the Related Art

In prior art storage systems, one or more host computers access a storage subsystem over a network such as a Storage Area Network (SAN). The network storage system may manage access to a storage enclosure including one or more interconnected hard disk drives, where the disk drives may be organized as a Redundant Array of Independent Disks (RAID), a Just a Bunch of Disks (JBOD), Direct Access Storage Device (DASD), etc. The host systems include Host Bus Adaptors (HBAs) providing a network connection to the storage subsystems. Host systems may view the physical storage space as a partition of Logical Unit Numbers (LUNs). The hosts will submit input/output (I/O) commands to a particular LUN, and the storage subsystem managing access to such targeted LUNs will translate the target LUN to a physical storage area. The LUNs within a storage subsystem are assigned to the host systems, and the host systems would direct I/O requests to their assigned LUNs.

Prior art storage subsystems often include a proprietary database to maintain information on attached hosts and LUN assignments and proprietary application programming interfaces (APIs) that may be used to extract information on attached host and LUN assignments and present such information in a report form. For instance, such a reporting API may be issued from a host system or a reporting server to obtain information on the attached hosts and assigned LUNs.

SUMMARY

Provided are a method, system, and program for providing information on a network storage system. Information is received from host systems identifying storage units the host systems access through at least one identified storage system. The at least one storage system is probed to determine storage units available through the storage system and an identifier of the storage system. The information received from the host systems on storage units the host systems access and the information probed from the at least one storage system on the storage units available through the storage system are processed to determine an association of host systems to storage units for the at least one storage system.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
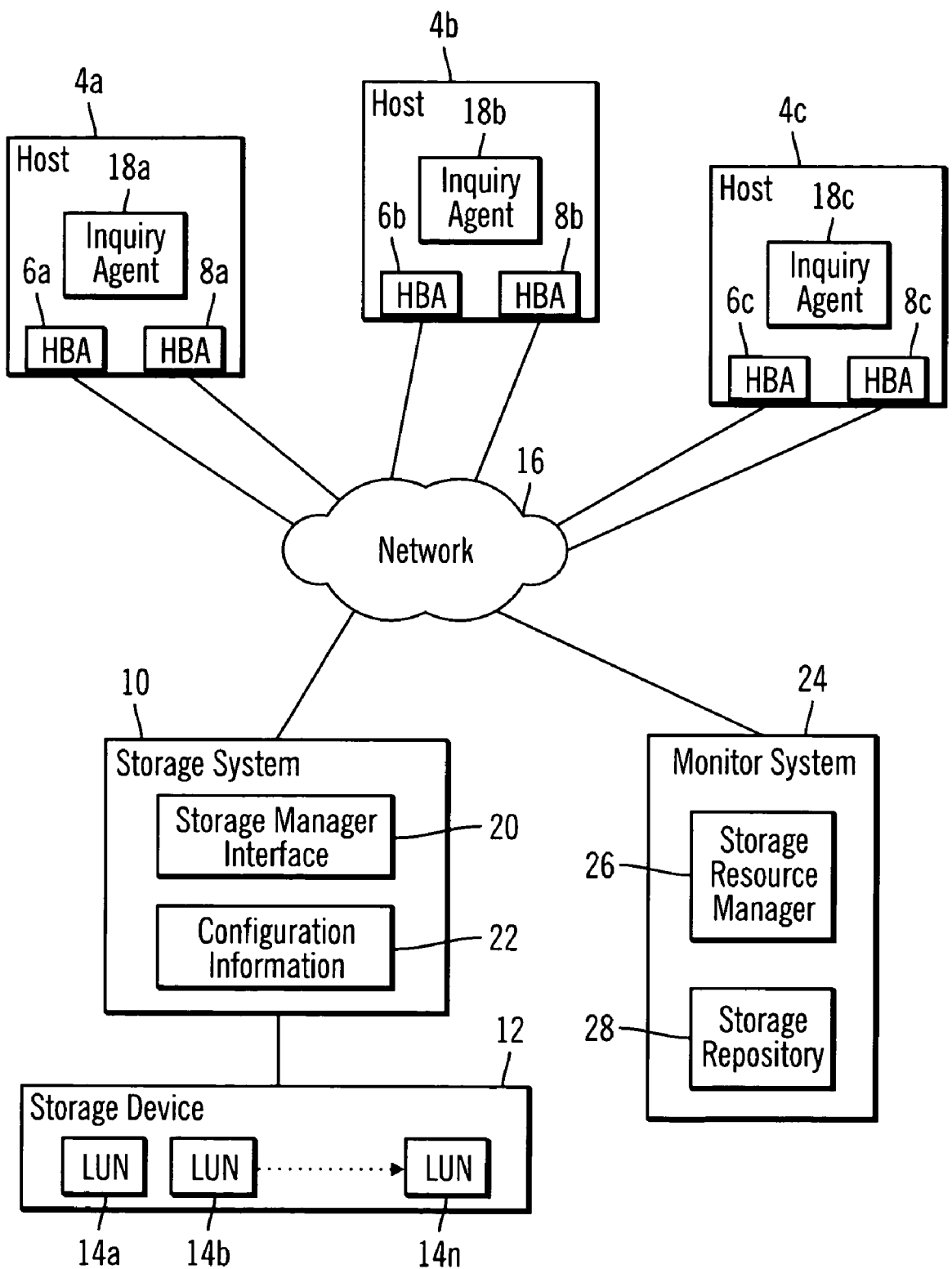
FIG. 1 is a block diagram illustrating a network computing environment in which embodiments of the invention are implemented.

FIG. 1 illustrates a computing environment in which preferred embodiments are implemented. Hosts $4a$, $4b$, $4c$ may comprise any computing device known in the art, including servers through which other client computers can access storage or clients. The hosts $4a$, $4b$, $4c$ each include one or more host bus adaptors (HBAs) $6a$, $8a$, $6b$, $8b$, $6c$, $8c$ (two are shown). The HBAs $6a$, $6b$, $6c$, $8a$, $8b$, $8c$ may comprise a Fibre Channel or Small Computer System Interface (SCSI) adaptor card or any other network adaptor card or on-board adaptor known in the art. A storage system 10 manages I/O access to a storage device 12, which may be configured as a RAID array, JBOD, DASD, etc. and be configured to include one or more logical unit numbers (LUNs) $14a$, $14b$ . . . $14n$. The hosts $4a$, $4b$, $4c$ communicate with the storage system 10 via a network 16, where the network may comprise a network known in the art, such as a Storage Area Network (SAN), Local Area Network (LAN), Wide Area Network (WAN), wireless network, the Internet, etc.

Each host $4a$, $4b$, $4c$ includes an inquiry agent program $18a$, $18b$, $18c$ to gather information on the LUNs $14a$, $14b$ . . . $14n$ to which the HBAs $4a$, $6a$, $4b$, $6b$, $4c$, $6c$ connect. The storage system 10 includes a storage manager interface 20 through which a system in the network 16 can access information and perform management operations with respect to the storage system 10. The configuration information 22 includes information on the configuration of the storage device 12, including LUNs $14a$, $14b$ . . . $14n$ accessible through the storage system 10. The storage manager interface 20 may comprise a web server that provides web pages through which another system can access configuration information and perform management operations with respect to the storage system 10. Additionally, the storage manager interface 20 may implement Application Programming Interfaces (APIs) that may be called from systems over the network 16 to access configuration information 22 and perform management related operations. In further implementations, the storage manager interface 20 may implement the Common Information Model (CIM) and Web Based Enterprise Management (WBEM) industry standard specifications. CIM provides a representation of a computer/network system and WBEM allows for the interchange of management information in a network environment including devices from different vendors, where the network may include heterogenous as well as homogeneous devices. The CIM schema specifies a set of classes, including methods and objects, that management programs call to obtain information and perform management operations with respect to devices in the network. Each vendor of a network that is capable of interfacing in a WBEM/CIM environment may provide a set of device specific extension classes which extend from the CIM classes. The device specific extension classes are managed by management programs through WBEM. A vendor of a network would provide a CIM Provider, which is a program module that maps CIM Classes, Properties, and Methods, as defined by the industry standard CIM model, to device specific APIs, or to another industry standard API, that may implement the functionality of a defined CIM class or extension class for the specific device.

A monitor system 24 is capable of communicating with the hosts 4a, 4b, 4c and storage system 10 over the network 16. The monitor system 24 includes a storage resource manager 26 to determine the assignment of host systems 4a, 4b, 4c to storage resources, such as LUNs 14a, 14b, 14c, by interacting with the storage system 10 and inquiry agents 18a, 18b, 18c in the hosts 4a, 4b, 4c. A storage repository 28 includes information on the assignment of hosts 4a, 4b, 4c to LUNs 14a, 14b, 14c in the storage device 12. The storage repository 28 may comprise a relational or non-relational database of information, or store host and storage system information, and host/LUN assignment information in other data structures known in the art, such as Extended Markup Language (XML) or other structured documents.

The described implementations show a certain number of hosts and a storage system. In additional implementations, there may be more or fewer host systems and there may be additional storage systems, where hosts may access LUNs managed by multiple storage systems.

Figure 2:
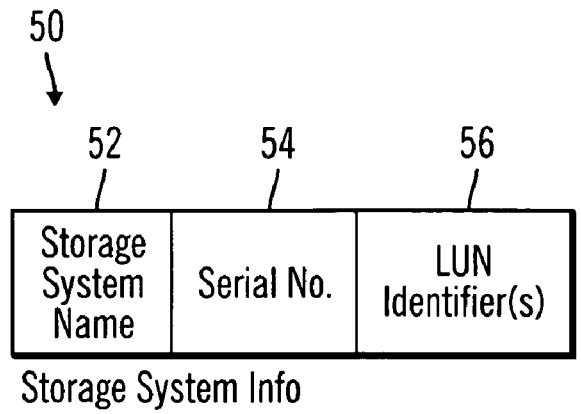
FIGS. 2, 3, and 4 illustrate an arrangement of information on host systems, storage systems, and Logical Unit Numbers (LUNs) in accordance with implementations of the invention.
Figure 3:
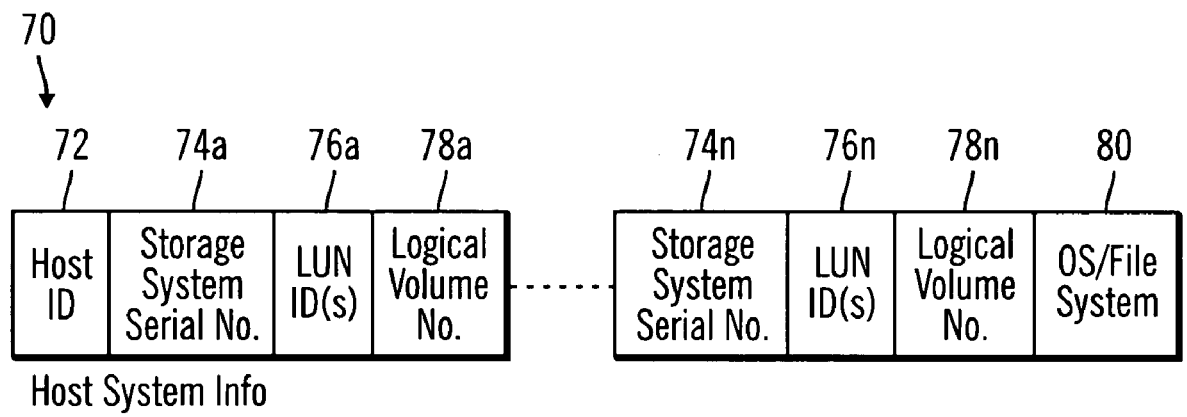
Figure 4:
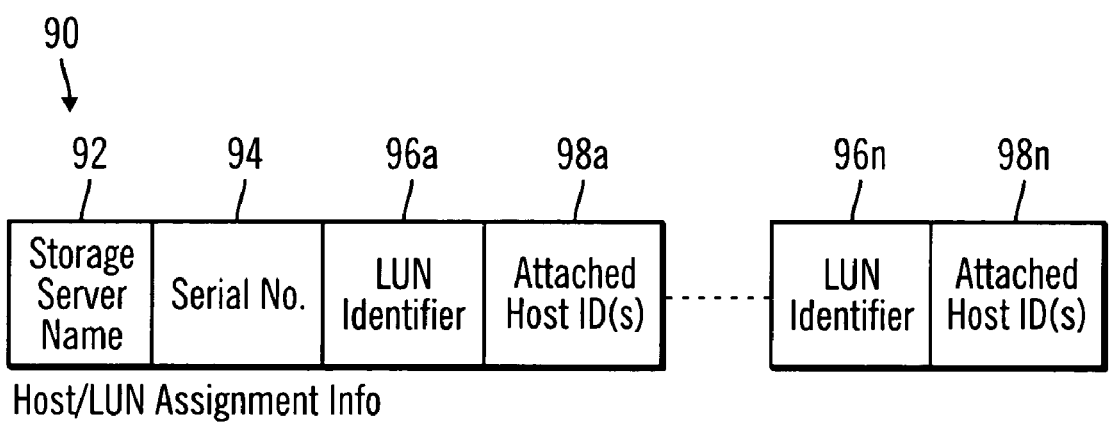

FIGS. 2, 3, and 4 illustrate information maintained in the storage repository 28. With respect to FIG. 2, storage system information 50 provides the information gathered from the storage system 10, including the name 52 of a storage system, the unique serial number 54 of the storage system, and the LUN identifiers of each LUN 14a, 14b . . . 14n configured in the storage device 12 managed by the identified storage system 10. The unique serial numbers may be globally unique. With respect to FIG. 3, host information 70 provides the information gathered from the host inquiry agents 18a, 18b, 18c, including: a name 72 of the host; for each disk to which the host 4a, 4b, 4c HBAs connects, the attached storage system serial ID 74a . . . 74n managing that disk, the LUN identifier (ID) 76a . . . 76n of the disk, and the host logical volume 78a . . . 78n assigned to the disk; and the operating system (O/S)/file system information 80 indicating the operating system/file system installed on the host.

FIG. 4 illustrates host/LUN assignment information 90 that the storage resource manager 26 may generate from the storage system 50 and the host system 70 information. The host/LUN assignment information 90 may include a name 92 and serial number 94 of a storage system 10 and for each LUN configured in the storage device 12 managed by that storage system 10, a LUN ID 96a . . . 96n and the host IDS 98a . . . 98n of one or more hosts that are accessing that LUN.

Figure 5:
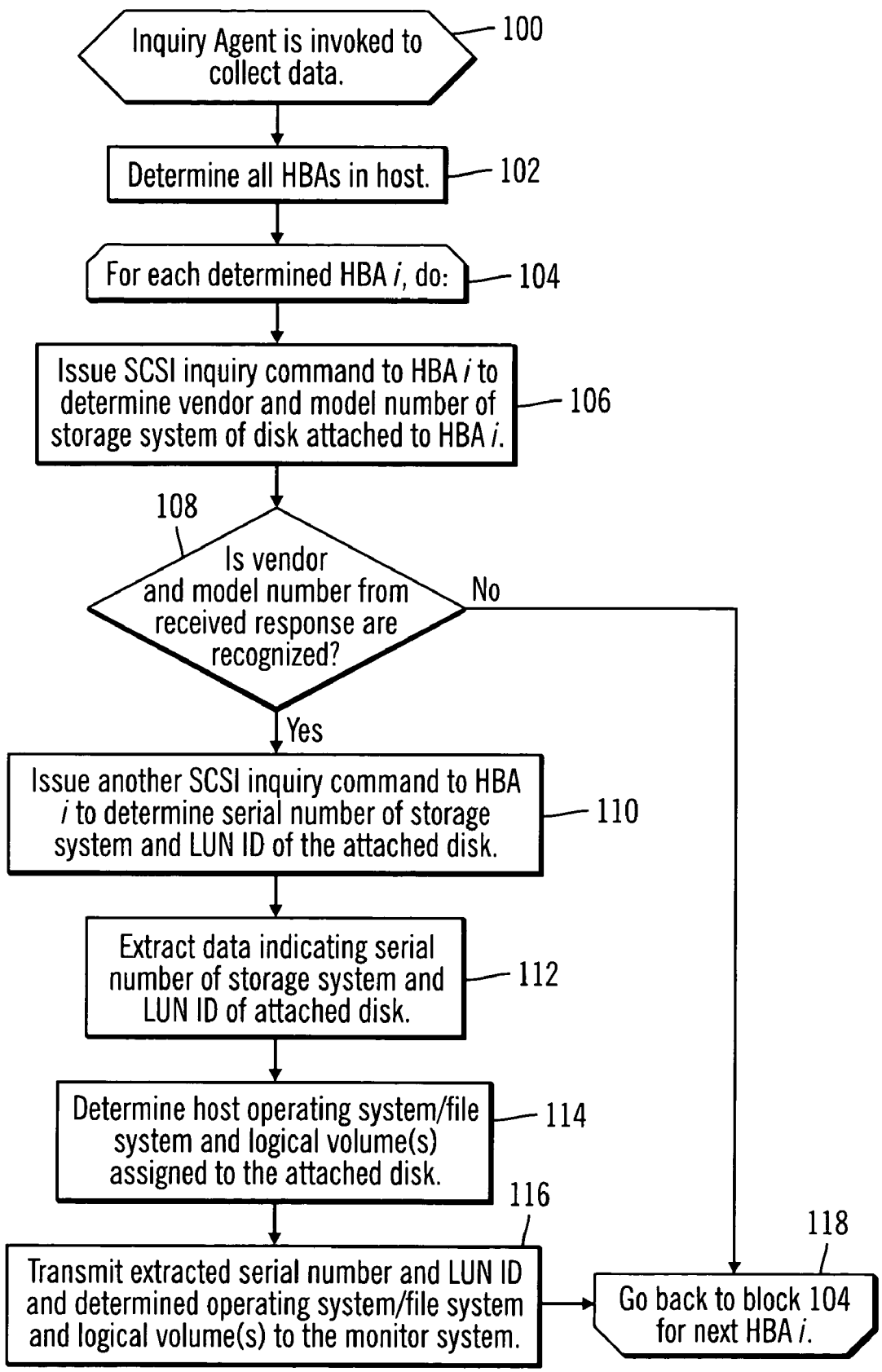
FIGS. 5, 6, 7, and 8 illustrates operations performed to gather and process the received information on host systems, storage systems, and the assignment of LUNs to host systems in accordance with implementations of the invention.

FIG. 5 illustrates operations performed by the inquiry agent 18a, 18b, 18c to gather information on the LUNs available to the host 4a, 4b . . . 4c in which the agent executes and transmit such gathered information to the monitor system 24. An available LUN is visible to the hosts 4a, 4b . . . 4c. Upon being invoked (at block 100), the inquiry agent 18a, 18b, 18c determines (at block 102) all HBAs in the host 4a, 4b, 4c in which the invoked inquiry agent 18a, 18, 18c executes. The inquiry agent 18a, 18b, 18c may be invoked according to a schedule or in response to a request from a user or program. The inquiry agent 18a, 18b, 18c performs a loop at blocks 104 through 118 for each HBA 6a, 8a, 6b, 8b, 6c, 8c in the host. At block 106, an inquiry command, such as a Small Computer System Interface (SCSI) inquiry command, is issued to HBA i to determine the vendor and model number of the storage system 10 having the disk attached to HBA i. If (at block 108) the vendor and model number of the storage system 12 indicated in the received response indicates that the storage system 10 is a recognizable system, then another inquiry command, such as a SCSI inquiry command, is issued (at block 110) to determine the serial number of the storage system 10 and the LUN 14a, 14b . . . 14n ID of the attached disk accessed through that storage system 10.

The inquiry agent 18a, 18b, 18c then extracts (at block 112) the serial number of the storage system 10 and the LUN ID of the attached disk from the information returned in response to the second inquiry command. The inquiry agent 18a, 18b, 18c further determines (at block 114) the host operating system/file system in which the inquiry agent 18a, 18b, 18c is executing and the logical volume(s) the host assigns to the attached disk. The inquiry agent 18a, 18b, 18c then transmits (at block 116) the extracted serial number LUN ID, and volume number of the attached one or more disks, and the determined host operating system/file system to the monitor system 24. From the no branch of block 108 or block 116, control proceeds (at block 118) back to block 104 for the next determined HBA i.

In alternative implementations, the inquiry agents 18a, 18b, 18c may issue one or more than two inquiry commands to determine information on attached disks and the storage system 10. Further, if an HBA 6a, 8a, 6b, 8b, 6c, 8c is attached to multiple disks, then the LUN ID and storage system 10 would be determined and transmitted to the monitor system 24 for each attached disk.

Figure 6:
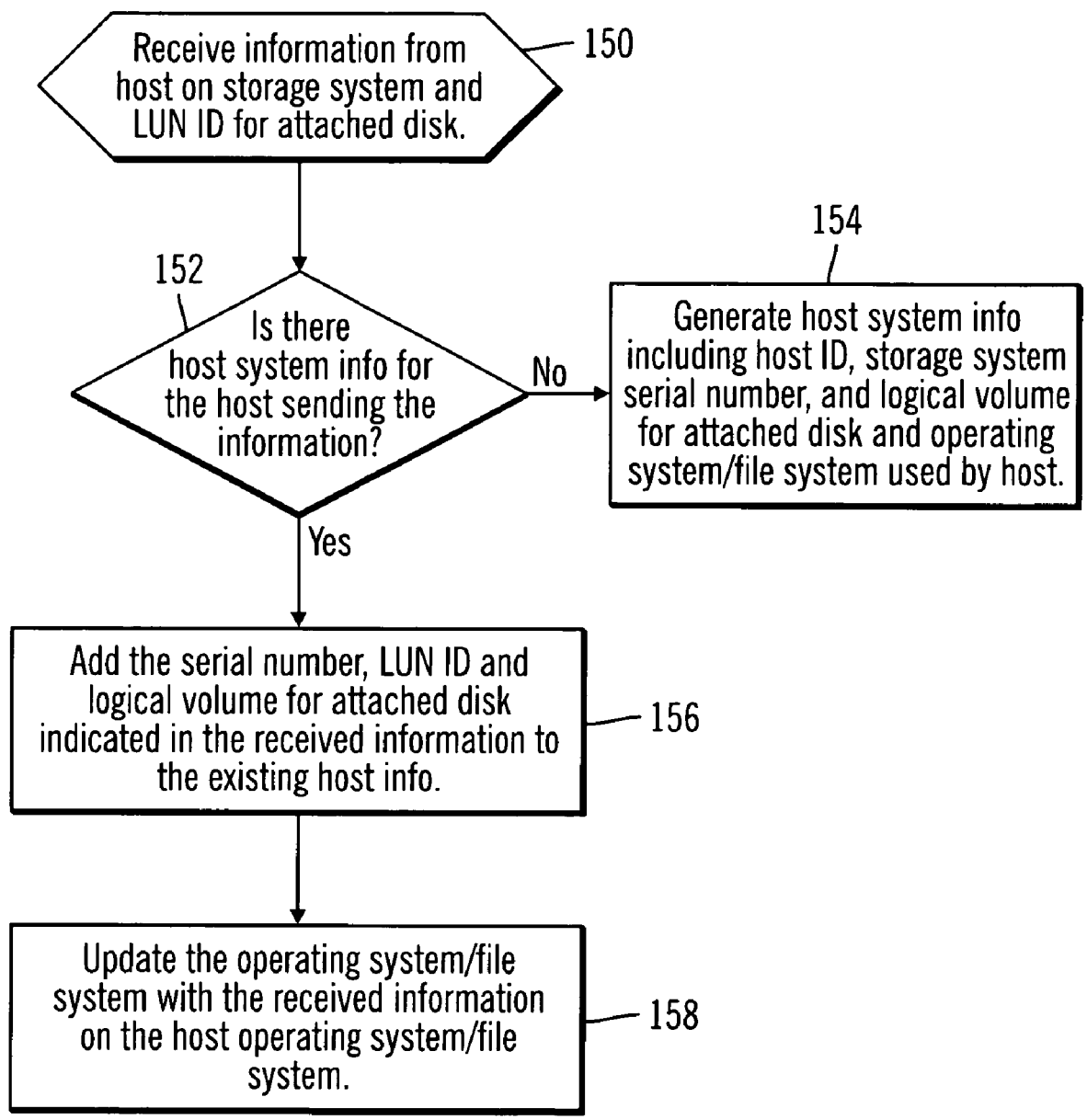
Figure 7:
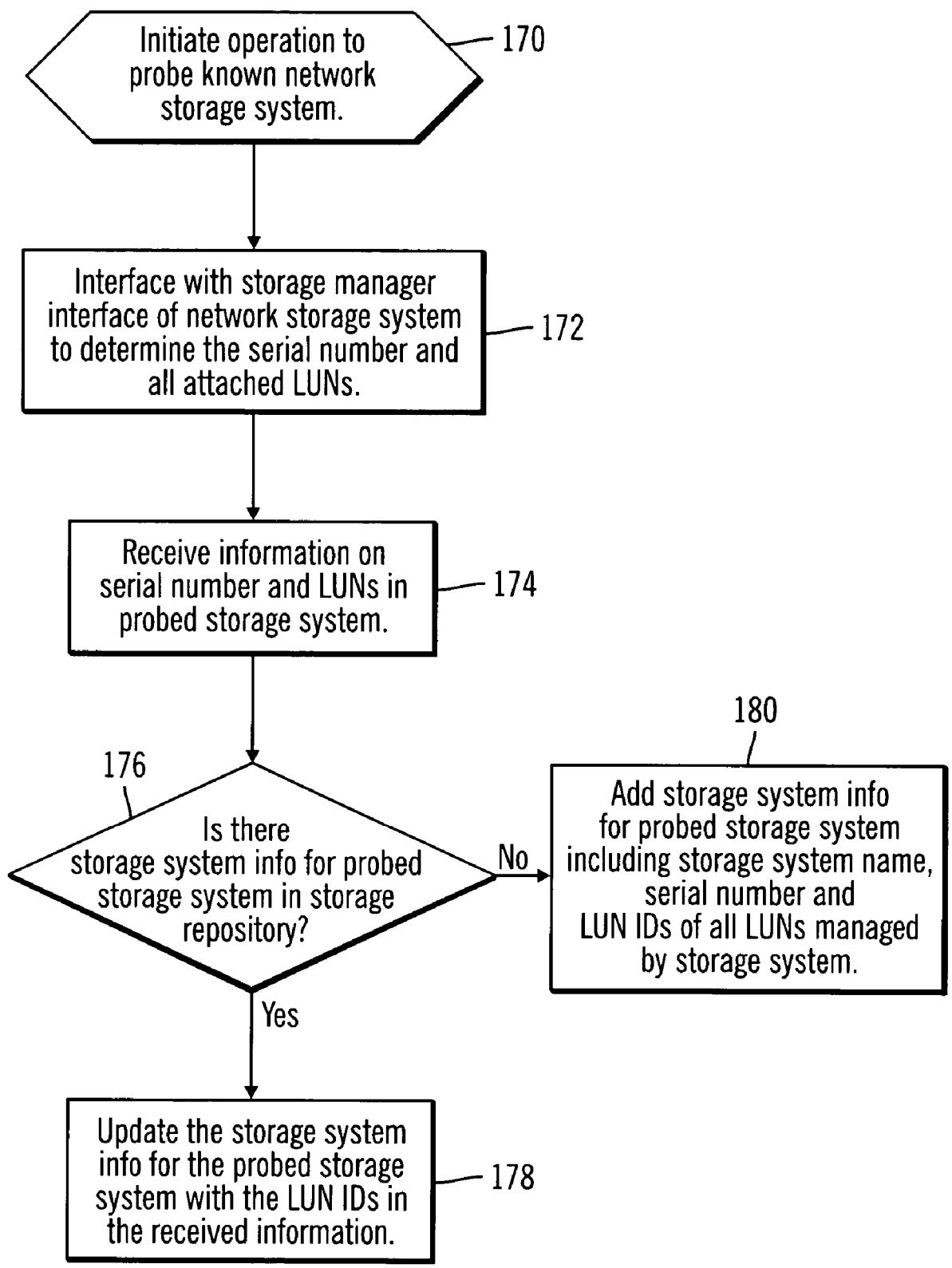
Figure 8:
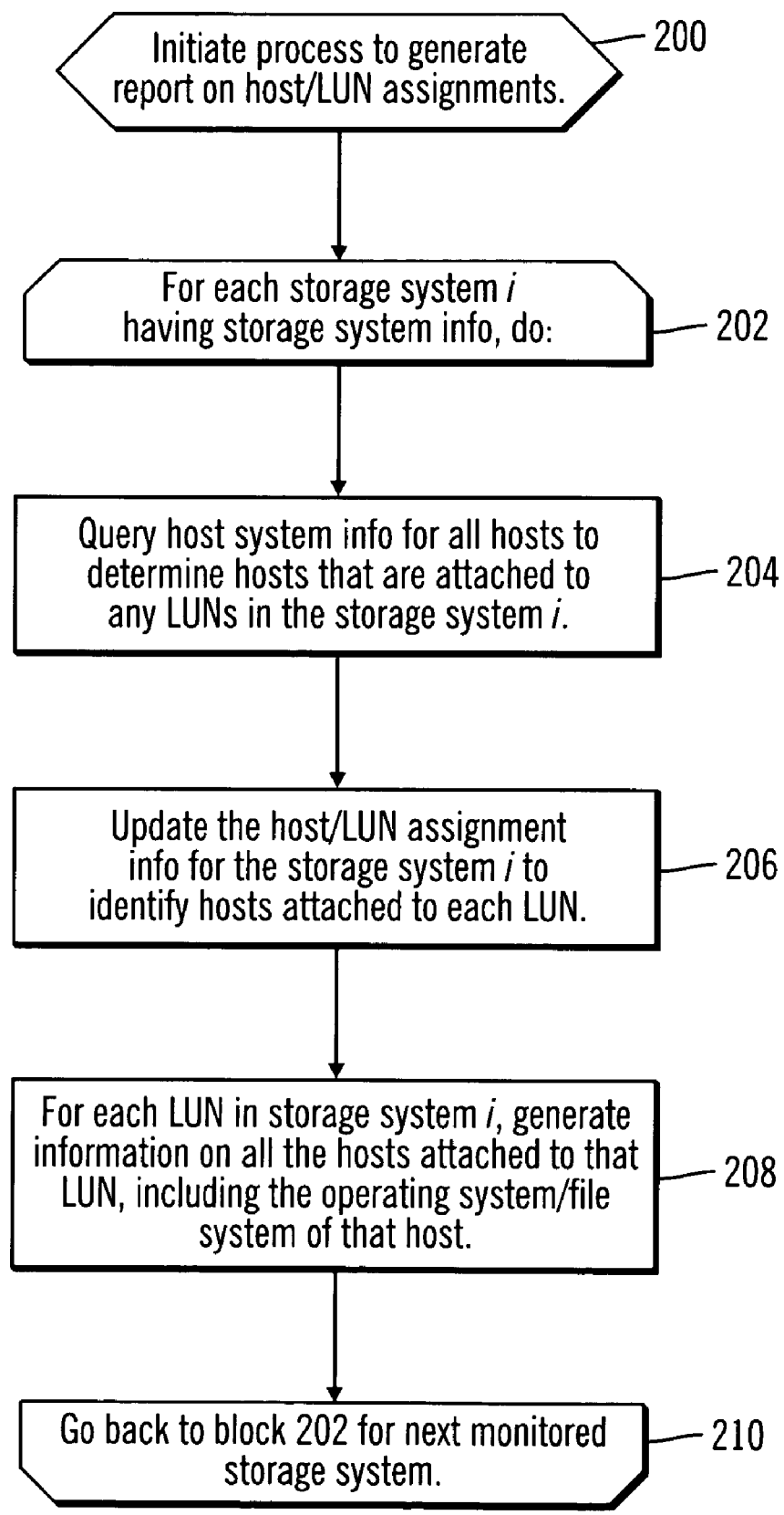

FIGS. 6, 7, and 8 illustrate operations performed by the storage resource manager 26 to process information on the host/LUN assignments in accordance with described implementations. The operations of FIG. 6 are initiated when the storage resource manager 26 receives (at block 150) information from an inquiry agent 18a, 18b, 18c concerning the storage system and LUN ID for an attached disk. If (at block 152) the storage repository 28 does not have host system information 70 (FIG. 3) for the host 4a, 4b, 4c transmitting the information, then the storage resource manager 26 4c generates host system information 70 for the transmitting host from the received information, including the host ID 70 for the transmitting host; the storage system serial number 74a, LUN ID 76a, and logical volume 78a for an attached disk; and the operating system/file system 78 used by the transmitting host 4a, 4b, 4c. If (at block 152) there is already host system information 70 (FIG. 3) for the transmitting host 4a, 4b, 4c, then the storage resource manager 26 adds (at block 156) the storage system 10 serial number, LUN ID and logical volume for the attached disk indicated in the received information as new fields 74n, 76n, 78n, respectively, to the existing host system information 70. Field 80 in the host system information 70 is updated (at block 158) with the host operating system/file system included with the received information.

FIG. 7 illustrates operations the storage resource manager 26 performs to obtain information from the storage systems 10 in the network 16. The storage resource manager 26 initiates (at block 170) an operation to probe a known network storage system 10. The storage resource manager 26 would then interface (at block 172) with the storage manager interface 20 of the network storage system 10 to determine the serial number and all attached LUN IDs 14a, 14b . . . 14n. In certain embodiments, the storage manager interface 20 may function as a proxy server for the storage system 10 and exist externally to the storage system 10. As discussed, the storage resource manager 26 may use an industry standard management interface, such as CIMOM, to access configuration information 22 from the storage system 10, such as the serial number of the system 10 and information on the attached LUNs 14a, 14b . . . 14n. Upon receiving (at block 174) information on the serial number and LUNs 14a, 14b . . . 14n in the probed storage system 10, if (at block 176) the storage repository 28 includes storage system information 50 (FIG. 2) for the probed storage system 10, then the preexisting storage system info 50 is updated (at block 178) with the received information, including the received serial number and LUN IDs 14a, 14b . . . 14n, which may involve overwriting and altering the LUN IDs 56 maintained in the preexisting storage system information 50. Otherwise, if (at block 176) there is no preexisting storage system information 50 for the probed storage system 10, then storage system information 50 for the probed storage system 10 is added (at block 178) to the storage repository 28, including the storage system name, serial number and LUN IDs of all LUNs 14a, 14b . . . 14n managed by that storage system 10.

FIG. 8 illustrates operations the storage resource manager 26 performs to generate a report on information of host/LUN assignments using the information from both the hosts 4a, 4b, 4c and the storage system 10. Upon initiating the report generating process on host/LUN assignments (at block 200), the storage resource manager 26 performs a loop at block 202 through 210 for each storage system i for which storage system information 50 (FIG. 2) is maintained in the storage repository 28. Every instance of host system information 70 is queried (at block 204) to determine hosts that are attached to any LUNs in the storage system i, i.e., those hosts having LUN IDs 76a . . . 76n in a storage system whose serial number 74a . . . 74n (FIG. 3) matches the serial number 54 in the storage system information 50 (FIG. 2) for storage system i. The storage resource manager 26 then updates (at block 206) the host/LUN assignment information 90 for the storage system i to identify the hosts 4a, 4b, 4c in fields 98a . . . 98n attached to the LUNs 14a, 14b . . . 14n for storage system i indicated in fields 96a . . . 96n. For each LUN in storage system i, identified in fields 96a . . . 96n, the storage resource manager 26 generates (at block 208) information on all the hosts, identified in fields 98a . . . 98n, attached to that LUN, including the operating system/file system of that host identified in field 80 of the host system information 70 for the reported host.

The described implementations determine host/LUN assignments in a manner that ensures that active host/LUN assignments are reported by determining all available LUNs at a storage system, and then from the hosts, determining which LUNs are available to that host. By using information independently gathered from the hosts on active LUN assignments and from the network storage system, the implementations verify that a host/LUN assignment is active and recognized from the host perspective, as well as the storage system perspective.

ADDITIONAL IMPLEMENTATION DETAILS

The network management operations described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, an inquiry agent executing in the host system uses the SCSI inquiry command to determine information on attached disks. In alternative implementations, alternative commands, such as proprietary or other standard interface commands, may be used to determine the information on attached disks. Further, when probing the storage systems, any storage management interface, proprietary or industry standard, may be used to obtain configuration information on the storage system.

In the described implementations, the information on an attached disk comprises a LUN ID. In alternative implementations, the storage space may be segregated into storage units having designations different than a "LUN ID".

In the described implementations, the storage resource manager 26 and storage repository 28 are implemented in a monitor system 24 (FIG. 1). In alternative implementations, the storage resource manager and storage repository may be implemented in different distributed devices. Alternatively, the storage resource manager 26 may be implemented in one of the hosts 4a, 4b, 4c or the storage system 10, as opposed to a separate monitor system 24.

FIGS. 2, 3, and 4 illustrate an arrangement of information maintained on storage systems, host systems, and the host/LUN assignments. Those skilled in the art will recognize that the described information may be stored in many different arrangements of information that may differ than the arrangement described in FIGS. 2, 3, and 4.

FIGS. 5-8 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 9:
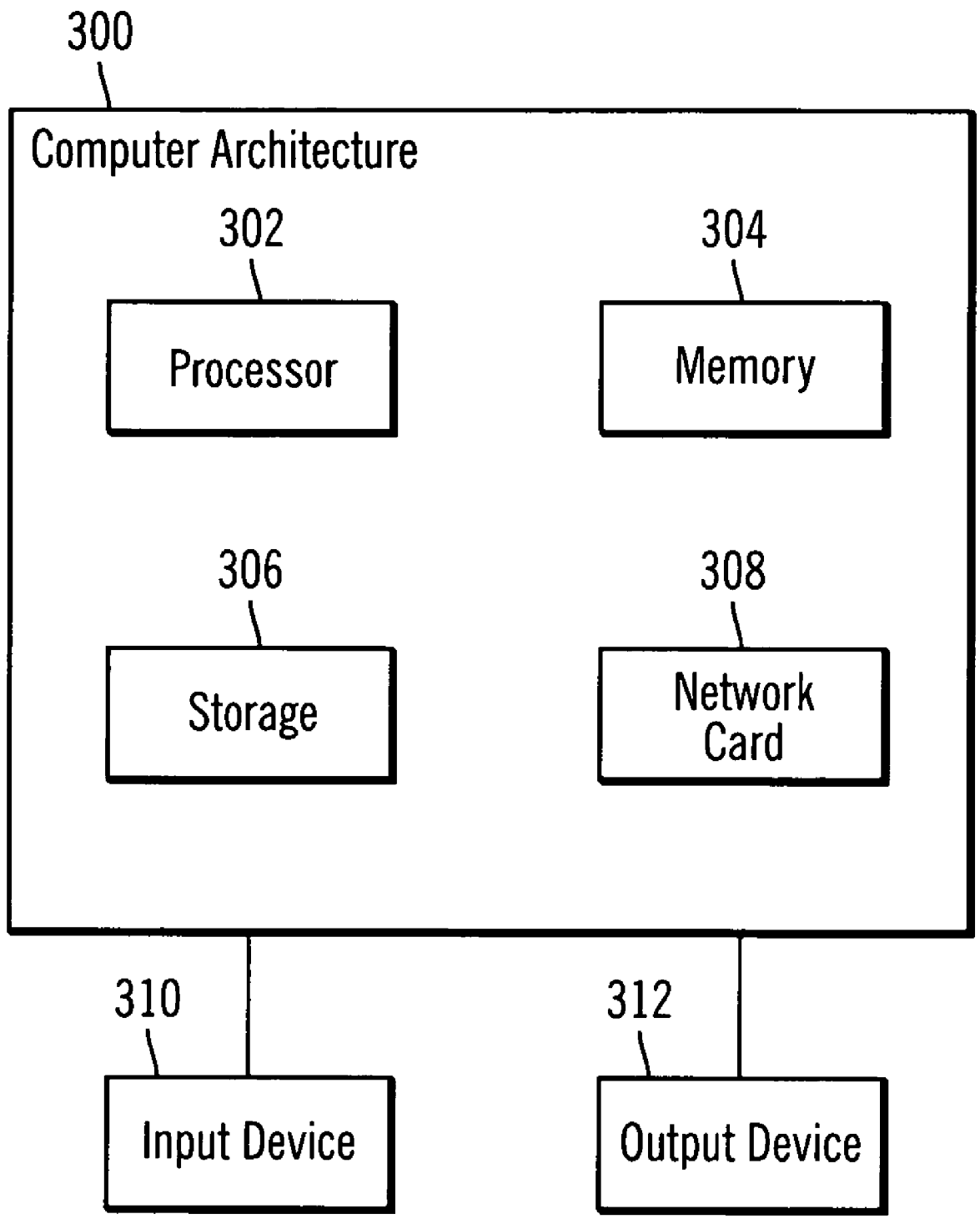
FIG. 9 illustrates a computing architecture that may be used to implement the network components described with respect to FIG. 1.

FIG. 9 illustrates one implementation of a computer architecture 300 of the network components shown in FIG. 1, such as the hosts, storage system, and monitor system. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for providing information on a network storage system, comprising:
   receiving, by a storage resource manager, information from at least one host system identifying storage units the host systems access through at least one identified storage system;
   probing, by the storage resource manager, the at least one storage system to determine storage units available through the storage system and an identifier of the storage system, wherein the storage system manages access to the storage units and maintains an assignment of host systems to the storage units;
   processing, by the storage resource manager, the information received from the host systems on storage units the host systems access and the information probed from the at least one storage system on the storage units available through the storage system;
   for each storage system determined by probing the at least one storage system, querying, by the storage resource manager, the information received from the host systems on storage units accessed by the host systems to determine at least one host system attached to storage units whose storage unit identifiers match storage unit identifiers available through the storage system; and
   generating, for each storage system determined by probing the at least one storage system, an association of the determined host systems to storage units for the storage system, wherein the association indicates for each storage system the identifier of the storage system, each storage unit available at the storage system and for each storage unit the at least one host system accessing the storage unit, and wherein the association is generated by using information independently gathered from the host systems and storage systems.

2. The method of claim 1, wherein the information from the host systems is gathered by an agent program executing in each host systems that queries the host system to determine the storage units the host system is capable of accessing and the at least one storage system through which the storage units are accessed, and wherein the agent program transmits the information on the accessible storage units and the at least one determined storage system to the storage resource manager.

3. The method of claim 2, wherein the agent program determines the accessible storage units and the at least one storage system by:
   issuing a first inquiry command to determine a vendor and model number of the storage system including the accessible at least one storage unit;
   determining whether the determined vendor and model number are for a recognizable storage system; and
   issuing a second inquiry command to determine the at least one accessible storage unit and the identifier of the storage system having the accessible storage unit if the determined vendor and model number are for one recognizable storage system.

4. The method of claim 2, wherein the agent program determines the accessible storage units and the at least one storage system by issuing at least one inquiry command that is a member of set of an industry standard storage interface.

5. The method of claim 4, wherein the industry standard storage interface comprises the Small Computer System Interface (SCSI) and wherein the inquiry command comprises a SCSI inquiry command and wherein the storage units comprise Logical Unit Numbers (LUNs).

6. The method of claim 1, wherein the storage resource manager, host systems, and storage systems are implemented in separate computing devices that communicate over a network.

7. The method of claim 1, further comprising:
   maintaining, by the storage resource manager, in a data repository: (i) host system information including the information received from the host systems identifying the host system and the storage units accessible from that host system and (ii) storage system information probed from the at least one storage system identifying the storage system and the storage units available at through that storage system.

8. The method of claim 7, further comprising:
   maintaining, by the storage resource manager, host/storage unit assignment information indicating for one storage system the storage units available through that storage system and the host systems that access the available storage units, wherein the host/storage unit assignment information is generated by processing the host system and storage system information in the data repository.

9. The method of claim 1, wherein probing the at least one storage system comprises using an industry standard storage management interface to access information from the storage system.

10. The method of claim 1, wherein the information received from the host systems indicates an operating system used by the host system, wherein the storage resource manager further performs:
    generating information on the association of the host systems to storage units for at least one storage system; and
    generating information on the operating system used by each host system associated with the storage units.

11. A system in communication with at least one storage system and at least one host system over a network, wherein the at least one storage system controls access to storage units, comprising:
    a processing unit; and
    a computer readable storage unit including a storage resource manager executed by the processing unit to perform operations, the operations comprising:
    receiving, by a storage resource manager, information from at least one host system identifying storage units the host systems access through at least one identified storage system;
    probing, by the storage resource manager, the at least one storage system to determine storage units available through the storage system and an identifier of the storage system, wherein the storage system manages access to the storage units and maintains an assignment of host systems to the storage units;
    processing, by the storage resource manager, the information received from the host systems on storage units the host systems access and the information probed from the at least one storage system on the storage units available through the storage system;

for each storage system determined by probing the at least one storage system, querying, by the storage resource manager, the information received from the host systems on storage units accessed by the host systems to determine at least one host system attached to storage units whose storage unit identifiers match storage unit identifiers available through the storage system; and generating, for each storage system determined by probing the at least one storage system, an association of the determined host systems to storage units for the storage system, wherein the association indicates for each storage system the identifier of the storage system, each storage unit available at the storage system and for each storage unit the at least one host system accessing the storage unit, and wherein the association is generated by using information independently gathered from the host systems and storage systems.

12. The system of claim 11, wherein the information from the host systems is gathered by an agent program executing in each host systems that queries the host system to determine the storage units the host system is capable of accessing and the at least one storage system through which the storage units are accessed, and wherein the agent program transmits the information on the accessible storage units and the at least one determined storage system to the storage resource manager.

13. The system of claim 12, wherein the agent program determines the accessible storage units and the at least one storage system by issuing at least one inquiry command that is a member of set of an industry standard storage interface.

14. The system of claim 13, wherein the industry standard storage interface comprises the Small Computer System Interface (SCSI) and wherein the inquiry command comprises a SCSI inquiry command and wherein the storage units comprise Logical Unit Numbers (LUNs).

15. The system of claim 12, wherein the agent program determines the accessible storage units and the at least one storage system by:
  issuing a first inquiry command to determine a vendor and model number of the storage system including the accessible at least one storage unit;
  determining whether the determined vendor and model number are for a recognizable storage system; and
  issuing a second inquiry command to determine the at least one accessible storage unit and the identifier of the storage system having the accessible storage unit if the determined vendor and model number are for one recognizable storage system.

16. The system of claim 11, further comprising:
a data repository including: (i) host system information including the information received from the host systems identifying the host system and the storage units accessible from that host system and (ii) storage system information probed from the at least one storage system identifying the storage system and the storage units available at through that storage system.

17. The system of claim 16, further comprising:
host/storage unit assignment information indicating for one storage system the storage units available through that storage system and the host systems that access the available storage units, wherein the host/storage unit assignment information is generated by processing the host system and storage system information in the data repository.

18. The system of claim 11, wherein probing the at least one storage system comprises using an industry standard storage management interface to access information from the storage system.

19. The system of claim 11, wherein the information received from the host systems indicates an operating system used by the host system, wherein the storage resource manager further performs:
  generating information on the association of the host systems to storage units for at least one storage system; and
  generating information on the operating system used by each host system associated with the storage units.

20. The system of claim 11, wherein the storage resource manager, host systems, and storage systems are implemented in separate computing devices that communicate over a network.

21. An article of manufacture comprising a computer readable storage medium including a storage resource manager for providing information on a network storage system controlling access to storage units and host systems, wherein the storage resource manager causes operations to be performed, the operations comprising:
  receiving, by a storage resource manager, information from at least one host system identifying storage units the host systems access through at least one identified storage system;
  probing, by the storage resource manager, the at least one storage system to determine storage units available through the storage system and an identifier of the storage system, wherein the storage system manages access to the storage units and maintains an assignment of host systems to the storage units; and
  processing, by the storage resource manager, the information received from the host systems on storage units the host systems access and the information probed from the at least one storage system on the storage units available through the storage system;
  for each storage system determined by probing the at least one storage system, querying, by the storage resource manager, the information received from the host systems on storage units accessed by the host systems to determine at least one host system attached to storage units whose storage unit identifiers match storage unit identifiers available through the storage system; and
  generating, for each storage system determined by probing the at least one storage system, an association of the determined host systems to storage units for the storage system, wherein the association indicates for each storage system the identifier of the storage system, each storage unit available at the storage system and for each storage unit the at least one host system accessing the storage unit, and wherein the association is generated by using information independently gathered from the host systems and storage systems.

22. The article of manufacture of claim 21, wherein the information from the host systems is gathered by an agent program executing in each host systems that queries the host system to determine the storage units the host system is capable of accessing and the at least one storage system through which the storage units are accessed, and wherein the agent program transmits the information on the accessible storage units and the at least one determined storage system to the storage resource manager.

23. The article of manufacture of claim 22, wherein the agent program determines the accessible storage units and the at least one storage system by issuing at least one inquiry command that is a member of set of an industry standard storage interface.

24. The article of manufacture of claim 23, wherein the industry standard storage interface comprises the Small Computer System Interface (SCSI) and wherein the inquiry command comprises a SCSI inquiry command and wherein the storage units comprise Logical Unit Numbers (LUNs).

25. The article of manufacture of claim 22, wherein the agent program determines the accessible storage units and the at least one storage system by:
  issuing a first inquiry command to determine a vendor and model number of the storage system including the accessible at least one storage unit;
  determining whether the determined vendor and model number are for a recognizable storage system; and
  issuing a second inquiry command to determine the at least one accessible storage unit and the identifier of the storage system having the accessible storage unit if the determined vendor and model number are for one recognizable storage system.

26. The article of manufacture of claim 21, wherein the operations further comprise:
  maintaining, by the storage resource manager, in a data repository: (i) host system information including the information received from the host systems identifying the host system and the storage units accessible from that host system and (ii) storage system information probed from the at least one storage system identifying the storage system and the storage units available at through that storage system.

27. The article of manufacture of claim 26, wherein the operations further comprise:
  maintaining, by the storage resource manager, host/storage unit assignment information indicating for one storage system the storage units available through that storage system and the host systems that access the available storage units, wherein the host/storage unit assignment information is generated by processing the host system and storage system information in the data repository.

28. The article of manufacture of claim 21, wherein probing the at least one storage system comprises using an industry standard storage management interface to access information from the storage system.

29. The article of manufacture of claim 21, wherein the information received from the host systems indicates an operating system used by the host system, wherein the storage resource manager further performs:
  generating information on the association of the host systems to storage units for at least one storage system; and
  generating information on the operating system used by each host system associated with the storage units.

30. The article of manufacture of claim 21, wherein the storage resource manager, host systems, and storage systems are implemented in separate computing devices that communicate over a network.

* * * * *